United States Patent Office 3,356,158
Patented Dec. 5, 1967

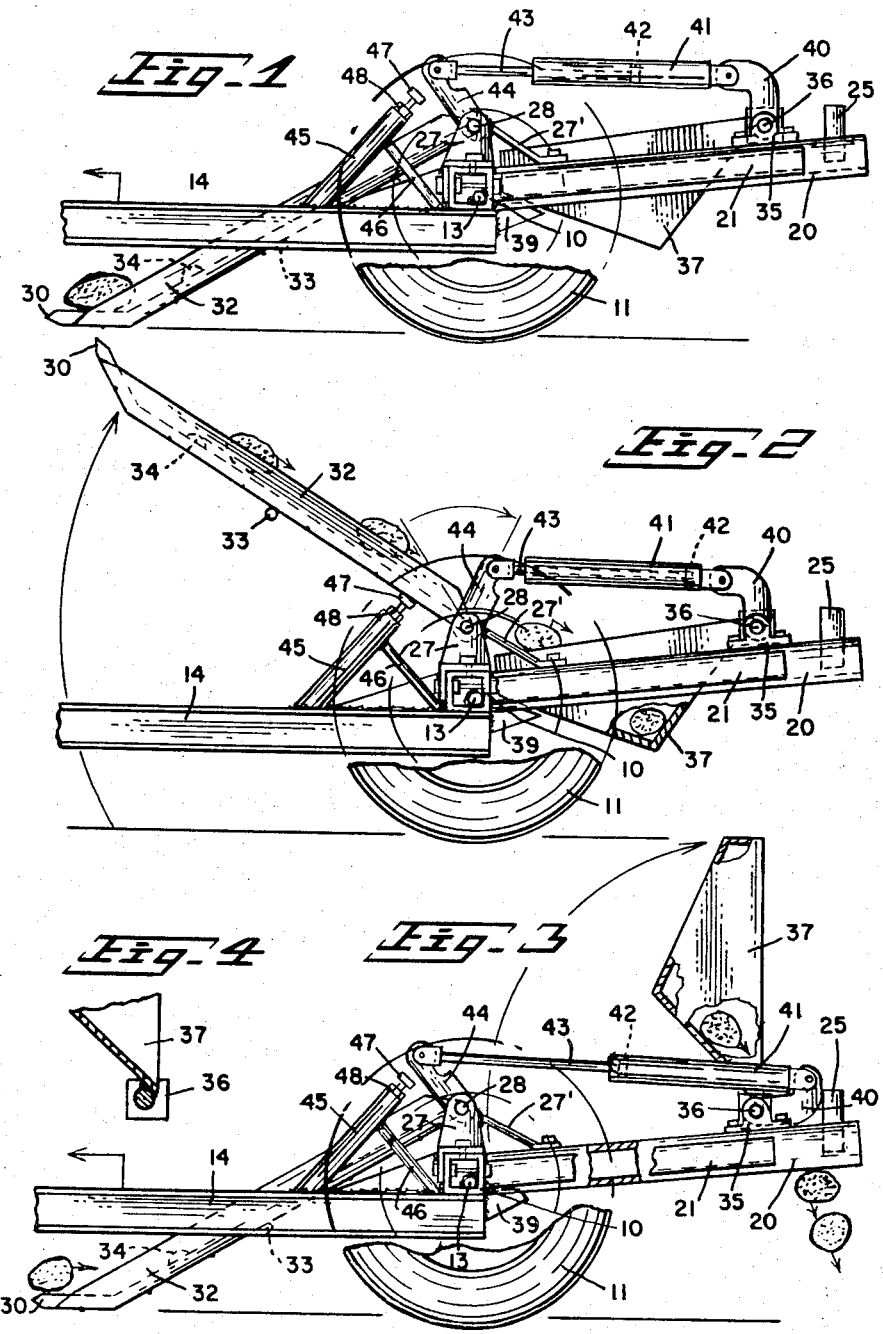

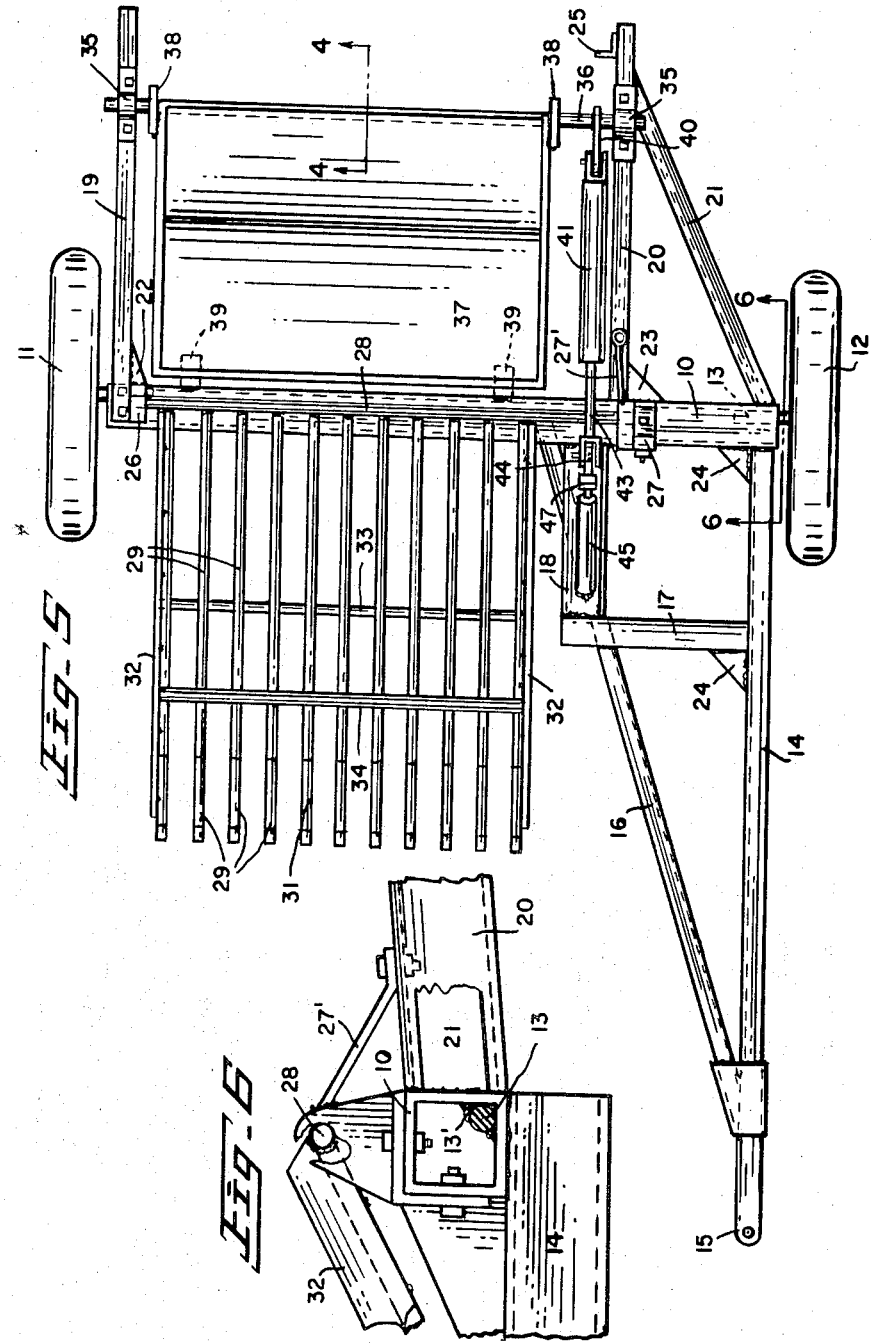

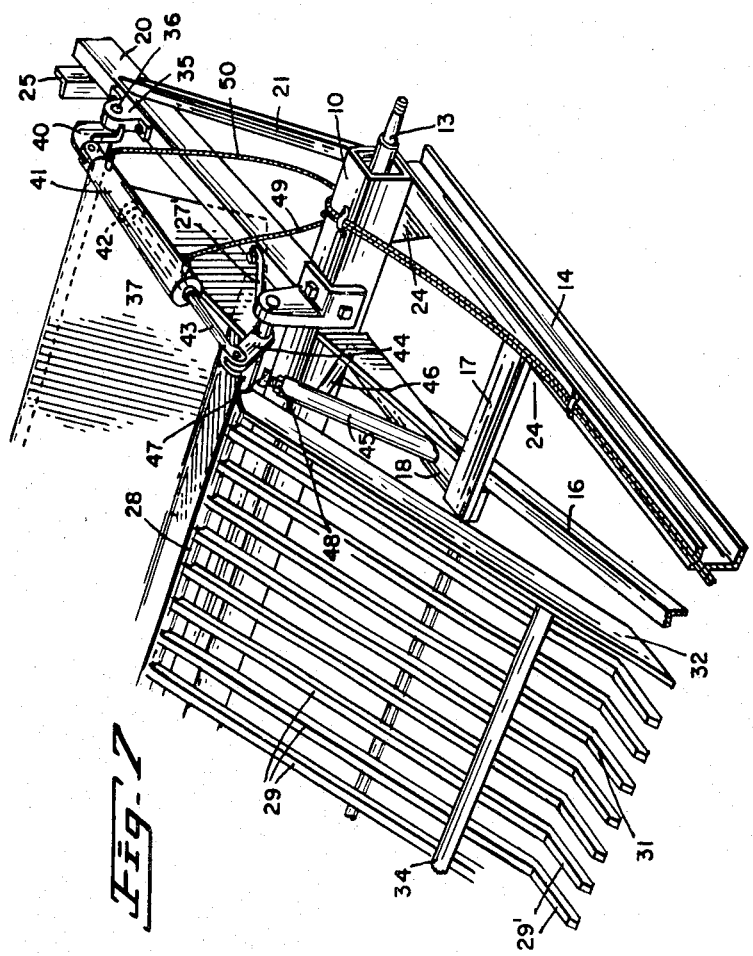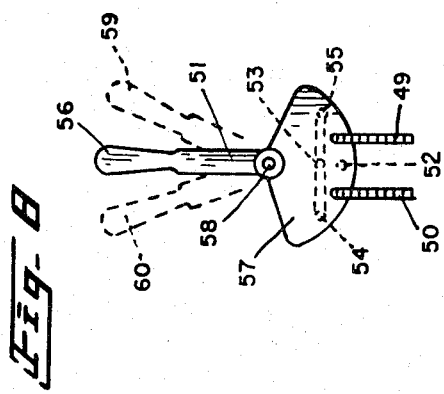

3,356,158
STONE PICKERS
Lloyd C. Deaver and Charles G. Deaver, both of
Kenaston, Saskatchewan, Canada
Filed June 1, 1965, Ser. No. 460,338
3 Claims. (Cl. 171—63)

ABSTRACT OF THE DISCLOSURE

A wheel supported frame having a rear pivoting container and a front pivoting fork grid for collecting stones from the ground and later elevating them to said container, including a stop member for limiting the ground penetration of the grid; and a double acting hydraulic cylinder connected between the grid and the container for lifting said grid by one power stroke while the container is resting on the frame, and for rear pivoting of said container by the opposite power stroke to empty same when the grid is limited by said stop member.

---

This invention relates to a device for clearing stones from a ground surface and the principal objects thereof are: to provide a tractor drawn machine having earth penetrating equipment thereon for dislodging and gathering stones; to power elevate said gathered stones to a container on said machine; and provide means for later deposit of said elevated stones from the container as and where desired.

A further object of the invention is: to provide said stone gathering equipment with means for separating loose earth and small stones from the larger ones and then elevating said larger stones to said container.

A further object of the invention is: to accomplish the work of elevating the larger stones into the container, and the later deposit of same by the use of double acting hydraulic cylinder.

A further object of the invention is: to provide adjustable and positive means for regulating the depth of said earth penetration by the above mentioned equipment.

A further object of the invention is: to utilize the elevation of said stone gathering equipment to clear and pass over obstructions, when the machine is travelling on a highway.

Still further objects of the invention are: to construct the machine in a well engineered and simple arrangement, for efficient operation; with a minimum of operable parts, for low cost manufacture and assembly; and of rugged sturdy construction, for many years of satisfactory trouble-free use.

With the above important and other minor objects in view, which will become more apparent as the description proceeds, the invention consists essentially in the design, arrangement and construction of the various parts hereinafter more particularly described, reference being had to the accompanying drawings wherein:

FIGURE 1 is a side view of the machine in the stone gathering position, but minus the draft connection.

FIGURE 2 is a side view similar to FIGURE 1 but showing the stone elevating position.

FIGURE 3 is a side view similar to FIGURE 1 but showing the stone dumping position.

FIGURE 4 is a partial vertical section taken on the line 4—4 of FIGURE 5, and with the container in stone dumping position.

FIGURE 5 on the second page is a plan view of FIGURE 1, and showing the complete machine.

FIGURE 6 is a vertical section taken on the line 6—6 of FIGURE 5.

FIGURE 7 on the third page is a perspective view of the principal working parts of the machine, and with a wheel removed.

FIGURE 8 is a diagrammatic view of the tractor hydraulic control for the stone elevating and dumping mechanisms.

In the drawings, like characters of reference indicate corresponding parts in the several figures.

A hollow square cross bar 10 has each end thereof supported by ground wheels 11 and 12, the stub axles of said wheels being welded in the ends of the cross bar, as at 13 (see FIGURE 6). One end of a draft channel iron 14 is welded under and to one end of the cross bar, and at right angles thereto, while the opposite end of the channel terminates in a clevis 15. A brace iron 16 angularly connects the draft channel to the bottom of the cross bar. A bar 17 connects the draft channel 14 with the brace angle 16, some distance in front of the cross bar 10, and its overhanging inner end connects with the front end of a support bar 18, which extends ahead from the cross bar 10, and rests on the brace angle 16.

A pair of spaced channel irons 19 and 20 extend rearwardly from the cross bar 10, the channel 20 being reinforced by a brace channel 21 from the draft channel end of the cross bar. Horizontal gusset plates 22 and 23 strengthen the connections of the channels 19 and 20 respectively with the cross bar. A further pair of gusset plates 24 connect the draft channel 14 with the bar 17 and the cross bar. A short vertical angle iron stop 25 is welded to the rear end of the channel 20.

A pair of bearings 26 and 27 are positioned on and bolted to opposite ends of the cross bar 10, adjacent the rear channels 19 and 20, the bearing 27 being strengthened by an upper rod brace 27' from the channel 20. These latter bearings pivotally support a shaft 28. A series of equally spaced solid square rods 29 have one end of each welded to the shaft 28, while their opposite ends project downward therefrom and bend ahead as at 29' to rest on the ground. The extreme front ends are sharpened, as at 30, and so form a pick-up grid 31 for stones. A metal side plate 32 is welded along the outer side of each of the outer rods 29, to form guides for the stones. A cross bar 33 underlies the central part of the rods, for spacing and reinforcement, while a second cross bar 34 is welded above the rods, but lower down, forming a ledge to support stones thereon and prevent them from falling off the front end, when same are later elevated.

A pair of bearings 35 are carried by the rear ends of the channels 19 and 20, one on each channel. A cross shaft 36 is pivotally mounted in these bearings and supports the rear of a container 37, to which it is welded. Small end plates 38 at each end of the container are also welded therein to strengthen the connection. The front of the container rests on brackets 39 which are welded to and extend rearwardly from the cross bar 10.

By observing FIGURES 1, 2 and 3, it will be seen that a bell crank 40 is secured to the shaft 36, between the container 37 and the bearing 35 of the channel 20. The opposite end of this bell crank is pivotally connected to one end of a double acting hydraulic cylinder 41, having a piston therein, indicated in dotted outline at 42. A rod 43 extends from this piston, out the opposite end of the cylinder, and pivotally connects with a crank 44 on the shaft 28. It will also be noted that an angularly positioned stop member 45 has its lower end welded to the support bar 18, while its upper end is further reinforced by a rod 46 which slopes in the opposite direction. The upper end of this stop member is drilled and tapped (not shown) to receive a threaded adjusting bolt 47 having a lock nut 48 thereon. The head of this threaded adjusting bolt is directly in the path of travel of the crank 44, and stops this crank to limit the amount of ground penetration by the ends of the pick-up grid 31. Obviously, adjustment of this bolt will regulate the amount of the penetration by the rods 29.

By observing FIGURE 7, it will be particularly noted that the front end of the cylinder 41 is connected with a flexible pipe 49 for fluid passage therebetween, while the rear end of the cylinder is connected to a flexible pipe 50 for the same purpose. These pipings pass over the cross bar 10 and are secured along the draft channel 14, to connect with the control 51 of a hydraulic pump (FIGURE 8) carried by the draft tractor (not shown). The outlet of the pump is shown in dotted outline at 52, and the intake at 53 is shown connected to two ports 54 and 55. The lever 56 of the plate 57 can be turned on the pivot 58, to connect the ends of the pipes 49 and 50 respectively with the ports 55 and 54 and with the outlet 52.

In operation: the stone picker is drawn over the ground by a tractor (not shown) through the hitch 15, the bent pick-up rods 29' scraping the ground, and the ground penetration being regulated by the stop member 45 obstructing the crank 44. These rods dislodge the stones on the surface of the ground, and they collect on the grid 31, some partially sliding up the rods 29 and over the cross bar 34, which tends to support them in this elevated position. As these stones roll around against each other, the dirt adhering thereto is inclined to be rubbed off. When a considerable group have been so collected, the operator on the tractor moves the lever 56 to the position shown in dotted outline at 59. This connects the piping 49 with the outlet port 52 and piping 50 with the intake port 54. Accordingly, pressured fluid from the pump passes along the piping 49 and moves the piston 42 to the back of the hydraulic cylinder 41. This movement operates the crank 44, and lifts the rods 29 while the container 37 is resting on the bracket 39 and elevates said stones into the container (see FIGURE 2), the cross bar 34 preventing the stones from falling off the front end. In this piston movement, the exhaust from the hydraulic cylinder passes along the piping 50 to the intake of the hydraulic pump. When the stones are in the container, the lever 56 is swung back to the dotted position 60, which reverses the connections to the pipings. Accordingly, the piston 42 returns the rods to the stone picking position shown, at which time the operator moves the lever 56 to the neutral position shown in FIGURE 8. When sufficient stones have been so elevated, the machine is drawn to a deposit location, and the lever 56 is then swung to the dotted position 60. The piston 42 now endeavors to move ahead, but due to the stop member 45 stopping the crank 44, the cylinder 41 moves back instead while the piston stays still. Accordingly, the bell crank 40 is forced back against the vertical angle iron stop 25, tipping the container 37, as shown in FIGURE 3, and emptying the stones therefrom. The operator then returns the lever 56 to neutral. In this dumping operation, the operator can shake the container in its tipped position by quickly reversing the lever 56 back and forth to opposite ports for the pipings. The rods 29 can be in a slightly elevated position during said dump travel. The stone picker is then returned to the field by the tractor and the rods 29 brought back to the stone collecting operation shown.

From the above it will be seen that a two-wheeled stone picking machine of very strong and rugged construction has been produced, which efficiently dislodges stones from the ground, rolls them around on the grid for cleaning as the machine passes over the ground, elevates the stones to the container the released dirt falling through the rods 29, and then transport them to a deposit location for a dropping where required. It will be particularly noted that the operations of lifting and dumping are accomplished by the same double acting hydraulic cylinder. The machine has a minimum number of parts for simplicity and ease of manufacture, as well as assembly and operation, and there is very little to go wrong. And the grid can be lifted into elevation, when the machine is drawn along a highway.

What we claim as our invention is:

1. A stone picking machine, comprising: a wheel supported frame; a shaft pivotally mounted across said frame; a crank secured to said shaft; a forward sloping series of grid rods having their upper ends secured to the shaft in spaced relation therealong and their lower ends normally riding the ground to pick up stones therefrom; a stop member carried by the frame and contactable by said crank to limit the down swinging movement of the grid rods; a container supported on the frame, behind the grid rods, for receiving stones therefrom when said grid rods are elevated by the pivoting movement of said shaft; the rear of said container pivotally mounted on the frame with the front thereof normally supported on a frame bracket; said container provided with crank means for rotation on its pivotal mount and for deposit of said received stones on the ground; and a double acting hydraulic cylinder pivotally suspended between said crank and said crank means for operation of the crank to elevate said grid rods in the power operation of said cylinder in one direction and while the container is resting on said bracket, and for operation of said crank means to pivot and empty said container in the power operation of said cylinder in the opposite direction and while said crank is in contact with said stop member.

2. A stone picking machine as defined in claim 1, wherein the crank contacting end of said stop member is adjustable in and away from said crank to regulate the ground penetration of the grid rods.

3. A stone picking machine, comprising: a wheel supported frame; a transverse shaft mounted in bearings on said frame and operable by a crank secured on one end thereof; a forward sloping series of parallel rods forming a grid and secured to the shaft in spaced relation therealong; the lower ends of said grid rods forwardly bent and sharpened to normally ride the ground and pick up stones therefrom as the machine moves over the ground; a stop member carried by the frame and positioned in the swinging path of said crank for contact thereby and limitation of the lowering movement of the grid rods; adjustable means on the contacting end of said stop member to regulate the ground penetration of said grid rods; a container mounted for rear pivoting on the frame, behind said grid rods, with the front end of said container adapted to receive stones from said grid rods when said rods are elevated on the shaft by said crank; said container provided with crank means for said rear pivoting; and a double acting hydraulic cylinder pivotally mounted on and between said crank and said crank means for rocking said crank and lifting said grid rods to deposit stones into said container by power operation of said cylinder in one direction and while said container is resting on said frame bracket, and for pivoting said crank means and said container to empty the received stones from said container in the power operation of said cylinder in the opposite direction and while the crank is stopped by said stop member.

References Cited

UNITED STATES PATENTS

| 2,738,633 | 3/1956 | Bestland et al. | 171—63 |
| 2,980,189 | 4/1961 | Jacobs | 171—63 |
| 3,100,540 | 8/1963 | Deaver et al. | 171—63 |

ANTONIO F. GUIDA, *Primary Examiner.*